US009559627B2

(12) United States Patent
Hsu et al.

(10) Patent No.: US 9,559,627 B2
(45) Date of Patent: Jan. 31, 2017

(54) SWITCHED RELUCTANCE MOTOR DEVICE, AND DRIVING CIRCUIT AND RELUCTANCE MOTOR THEREOF

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

(73) Assignee: Chieh-Sen Tu, New Taipei (TW)

( * ) Notice: Subject to any disclaimer, the term of this patent is extended or adjusted under 35 U.S.C. 154(b) by 72 days.

(21) Appl. No.: 14/611,703

(22) Filed: Feb. 2, 2015

(65) Prior Publication Data

US 2015/0381098 A1 Dec. 31, 2015

(30) Foreign Application Priority Data

Jun. 25, 2014 (TW) .................................. 103121931

(51) Int. Cl.
*H02P 25/08* (2016.01)
*H02P 25/22* (2006.01)

(52) U.S. Cl.
CPC ............ *H02P 25/22* (2013.01); *H02P 25/092* (2016.02)

(58) Field of Classification Search
USPC ......... 318/701, 254.1, 400.41; 310/183, 326, 310/156.74, 156.76, 156.77, 179, 180
See application file for complete search history.

(56) References Cited

U.S. PATENT DOCUMENTS

| 4,580,087 A * | 4/1986 | Bocca ...................... H02P 8/32 318/685 |
| 5,296,785 A * | 3/1994 | Miller ................. B60G 17/0157 280/5.501 |
| 5,814,965 A * | 9/1998 | Randall ................. H02P 25/092 318/400.11 |
| 6,008,561 A * | 12/1999 | Tang .................... H02K 19/103 310/180 |
| 2015/0280552 A1* | 10/2015 | Hsu ......................... H01F 27/24 323/362 |

* cited by examiner

*Primary Examiner* — Jorge L Carrasquillo
(74) *Attorney, Agent, or Firm* — McNees Wallace & Nurick LLC

(57) ABSTRACT

A switched reluctance motor device includes first and second winding components wound around a stator one on top of the other, multiple damping capacitors, a capacitor battery unit and a switching circuit. The first winding component has multiple first winding portions coupled in series to form a close loop. The second winding component has multiple second winding portions coupled in a star configuration and cooperating with the damping capacitors to form multiple resonant circuits. The switching circuit switches one first winding portion from a magnetizing state to a demagnetizing state, and induces generation of a resonant current in the corresponding resonant circuit to charge the capacitor battery unit.

12 Claims, 7 Drawing Sheets

SWITCHED RELUCTANCE MOTOR DEVICE, AND DRIVING CIRCUIT AND RELUCTANCE MOTOR THEREOF

CROSS-REFERENCE TO RELATED APPLICATION

This application claims priority to Taiwanese Application No. 103121931, filed on Jun. 25, 2014.

FIELD OF THE INVENTION

The invention relates to a reluctance motor device, and more particularly to a switched reluctance motor device.

BACKGROUND OF THE INVENTION

Referring to FIGS. 1 and 2, a conventional switched reluctance motor device includes a reluctance motor 1 and a driving circuit 2. The reluctance motor 1 includes a stator 11 having eight projecting poles (A, A', B, B', C, C', D, D'), a rotor 12 disposed within the stator 11 and having six salient poles (a, a', b, b', c, c'), and four phase windings that are respectively wound around radially opposite pairs of the projecting poles (A-A', B-B', C-C', D-D') of the stator 11 (hereinafter, phase windings (A", B", C", D") are used). Each of the phase windings (A", B", C", D") has a first winding segment ($L_1$) and a second winding segment ($L_2$) respectively wound around the projecting poles of the corresponding radially opposite pair.

The driving circuit 2 is electrically coupled to a direct current (DC) power source ($V_{dc}$), and includes four bridge arms 21-24 electrically coupled in parallel with the DC power source ($V_{dc}$), and respectively corresponding to the phase windings (A", B", C", D"). Each of the bridge arms 21-24 includes a first switch ($Q_u$) electrically coupled between a positive terminal of the DC power source ($V_{dc}$) and a first end of a corresponding phase winding (A", B", C", D"), a second switch ($Q_n$) electrically coupled between a negative terminal of the DC power source ($V_{dc}$) and a second end of the corresponding phase winding (A", B", C", D"), a first diode ($D_1$) having an anode that is electrically coupled to the negative terminal of the DC power source ($V_{dc}$) and a cathode that is electrically coupled to the first end of corresponding phase winding (A", B", C", D"), and a second diode ($D_2$) having an anode that is electrically coupled to the second end of corresponding phase winding (A", B", C", D") and a cathode that is electrically coupled to the positive terminal of the DC power source ($V_{dc}$).

The driving circuit 2 sequentially switches the phase windings (A", B", C" and D") to a magnetizing state. Referring to FIGS. 1 to 3, as an example, in a first basic cycle, the first and second switches ($Q_u,Q_n$) of the bridge arm 21 that correspond to the phase winding (A") conduct, such that the first and second winding segments ($L_1, L_2$) of the phase winding (A") are electrically coupled to the DC power source ($V_{dc}$), and the corresponding projecting poles (A, A') generate magnetic attractions that cause movements of the salient poles (a, a') toward the projecting poles (A, A'). Then, in a second basic cycle, the first and second switches ($Q_u, Q_n$) of the bridge arm 21 becomes non-conducting, and the first and second switches ($Q_u, Q_n$) of the bridge arm 22 conduct, such that the first and second winding segments ($L_1, L_2$) of the phase winding (B") are electrically coupled to the DC power source ($V_{dc}$), and the corresponding projecting poles (B, B') generate magnetic attractions that cause movements of the salient poles (a, a') toward the projecting poles (B, B'). Similarly, the phase windings (C", D") are subsequently and sequentially switched to the magnetizing state, to thereby drive clockwise rotation of the rotor 12. In contrast, when the phase windings (A", B", C", D") are switched to the magnetizing state in a sequence of (D"), (C"), (B"), and (A"), the rotation of the rotor 12 may be driven in a counterclockwise direction.

However, referring to FIG. 4, at the end of each basic cycle, e.g., when the first and second switches ($Q_u$, $Q_n$) of the bridge arm 21 are switched to non-conducting, a transient counter-electromotive force ($e_1$, $e_2$) may be generated on each of the first and second winding segments ($L_1$, $L_2$) of the phase winding (A"), resulting in a large current flowing toward the DC power source ($V_{dc}$) through the first and second diodes ($D_1$, $D_2$) of the bridge arm 21, and in a high-voltage impact on the DC power source ($V_{dc}$), which may cause over-heating of the DC power source ($V_{dc}$) due to an excessively large transient current.

SUMMARY OF THE INVENTION

Therefore, an object of the present invention is to provide a switched reluctance motor device that may recycle a counter-electromotive force generated by windings thereof.

According to one aspect of the present invention, a switched reluctance motor device includes a rotor, a stator, a first winding component, a second winding component, a capacitor battery unit, a switching circuit and N damping capacitors, where N is an integer not smaller than 3.

The first winding component has a number N of first phase winding portions that are wound around the stator, and that are electrically coupled in series to form a close loop having N first circuit nodes among the first phase winding portions. The second winding component has N second phase winding portions that are wound around the stator, that respectively correspond to the first phase winding portions, and that are electrically coupled in a star configuration. For each corresponding pair of the first phase winding portions and the second phase winding portions, one of the first phase winding portion and the second phase winding portion is wound around the other of the first phase winding portion and the second phase winding portion.

The capacitor battery unit is electrically coupled to the second winding component, and is configured to provide a direct current (DC) voltage.

The switching circuit is electrically coupled to the capacitor battery unit and the N first circuit nodes for transmitting the DC voltage from the capacitor battery unit to the first winding component, and is configured to switch one of the first phase winding portions, which serves as an operating phase winding portion, from a magnetizing state to a demagnetizing state.

The N damping capacitors respectively and electrically coupled to the second phase winding portions in parallel, to thereby form N resonant circuits that respectively correspond to the N first phase winding portions and that are electrically coupled to the capacitor battery unit.

To put the operating phase winding portion in the magnetizing state, the switching circuit makes conduction between the operating phase winding portion and the capacitor battery unit, resulting in magnetization of the operating phase winding portion by the DC voltage provided from the capacitor battery unit, and enabling rotation of the rotor.

To put the operating phase winding portion in the demagnetizing state, the switching circuit terminates conduction between the operating phase winding portion and the capacitor battery unit, resulting in demagnetization of the operating phase winding portion, such that one of the resonant circuits that corresponds to the operating phase winding portion makes resonance, and generates a resonant current to charge the capacitor battery unit.

Another object of the present invention is to provide a driving circuit of the switched reluctance motor device of this invention.

According to another aspect of the present invention, a driving circuit for driving a reluctance motor is provided. The reluctance motor includes a rotor, a stator, a first winding component and a second winding component. The first winding component has a number N of first phase winding portions that are wound around the stator, and that are electrically coupled in series to form a close loop having N first circuit nodes among the first phase winding portions, where N is an integer not smaller than 3. The second winding component has N second phase winding portions that are wound around the stator, that respectively correspond to the first phase winding portions, and that are electrically coupled in a star configuration. For each corresponding pair of the first phase winding portions and the second phase winding portions, one of the first phase winding portion and the second phase winding portion is wound around the other one of the first phase winding portion and the second phase winding portion.

The driving circuit includes a capacitor battery unit, a switching circuit and N damping capacitors.

The capacitor battery unit has a positive terminal and a negative terminal to provide a direct current (DC) voltage therebetween.

The switching circuit includes N bridge arms and N damping capacitors. The N bridge arms are electrically coupled in parallel between a positive terminal and a negative terminal of the capacitor battery unit. Each of the bridge arms includes a first switch and a second switch that are electrically coupled in series between the positive and negative terminals of the capacitor battery unit. A common node of the first and second switches is to be electrically coupled to a respective one of the first circuit nodes. The N damping capacitors are electrically coupled to the capacitor battery unit, and to be respectively and electrically coupled to the second phase winding portions in parallel.

Yet another object of the present invention is to provide a reluctance motor of the switched reluctance motor device of this invention.

According to another aspect of the present invention, a reluctance motor includes a rotor, a stator, a first winding component and a second winding component.

The first winding component has a number N of first phase winding portions that are wound around the stator, and that are electrically coupled in series to form a close loop having N first circuit nodes among the first phase winding portions, where N is an integer not smaller than 3.

The second winding component has N second phase winding portions that are wound around the stator, that respectively correspond to the first phase winding portions, and that are electrically coupled in a star configuration.

For each corresponding pair of the first phase winding portions and the second phase winding portions, one of the first phase winding portion and the second phase winding portion is wound around the other one of the first phase winding portion and the second phase winding portion.

BRIEF DESCRIPTION OF THE DRAWINGS

Other features and advantages of the present invention will become apparent in the following detailed description of embodiment with reference to the accompanying drawings, of which.

DETAILED DESCRIPTION OF THE EMBODIMENT

Figure 1:
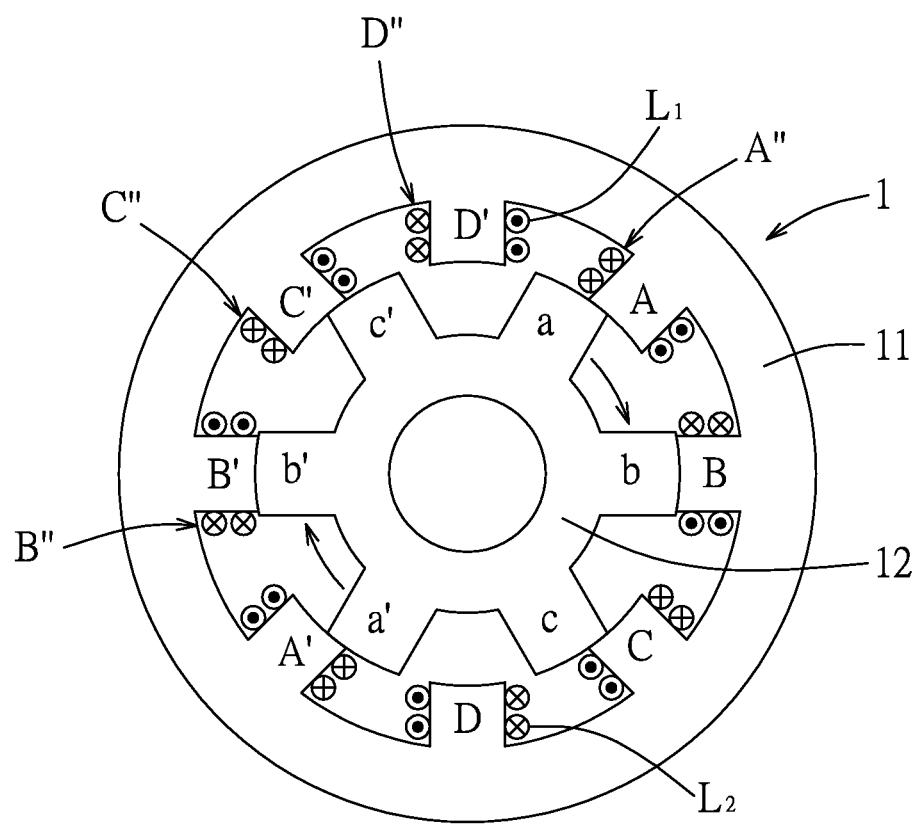
FIG. 1 is a partly-sectional schematic view illustrating a reluctance motor of a conventional switched reluctance motor device.
Figure 2:
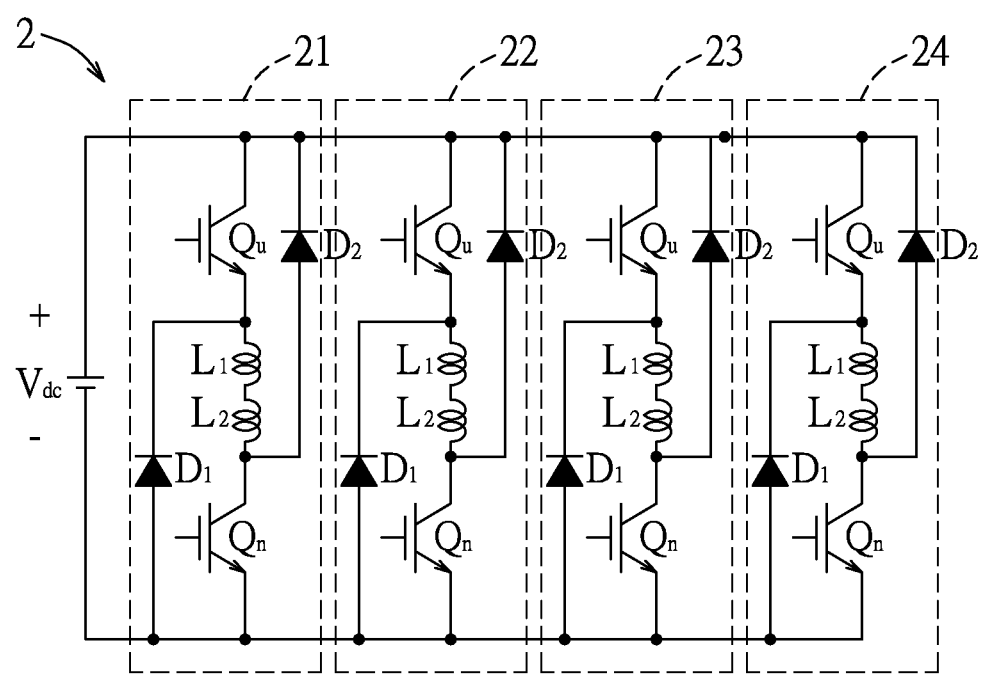
FIG. 2 is a schematic circuit diagram illustrating electrical connections among a driving circuit and phase windings of the conventional switched reluctance motor device.
Figures 3, 4:
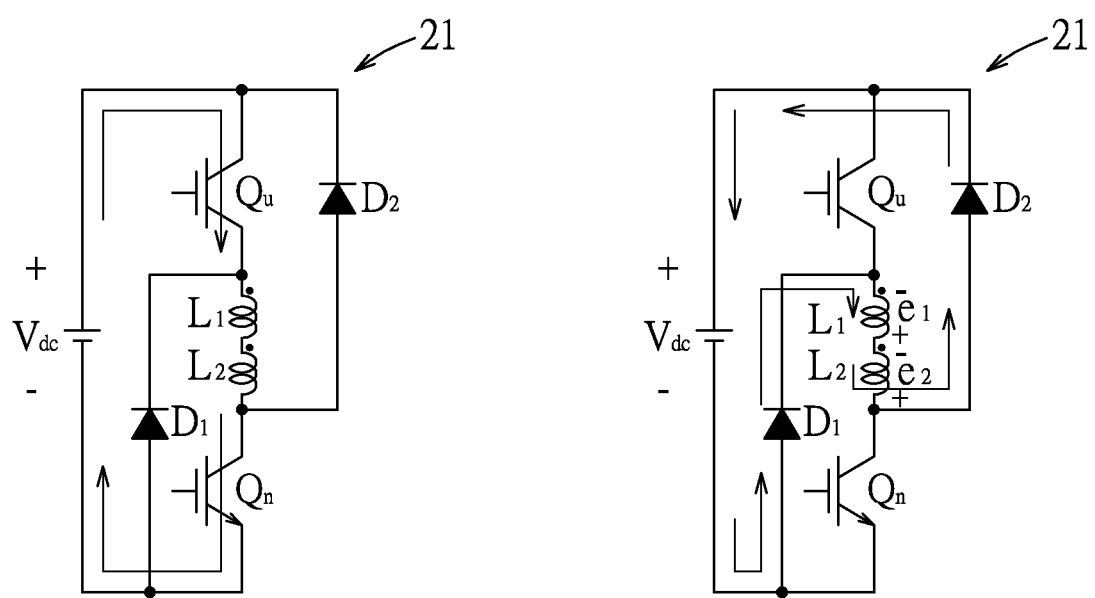
FIG. 3 is a schematic circuit diagram illustrating operation of the conventional switched reluctance motor device, in which switches of a bridge arm of the driving circuit conduct to couple a corresponding phase winding to a DC power source.
FIG. 4 is a schematic circuit diagram illustrating generation of counter-electromotive forces during operation of the conventional switched reluctance motor device when the switches of the bridge arm are switched to non-conducting.
Figure 5:
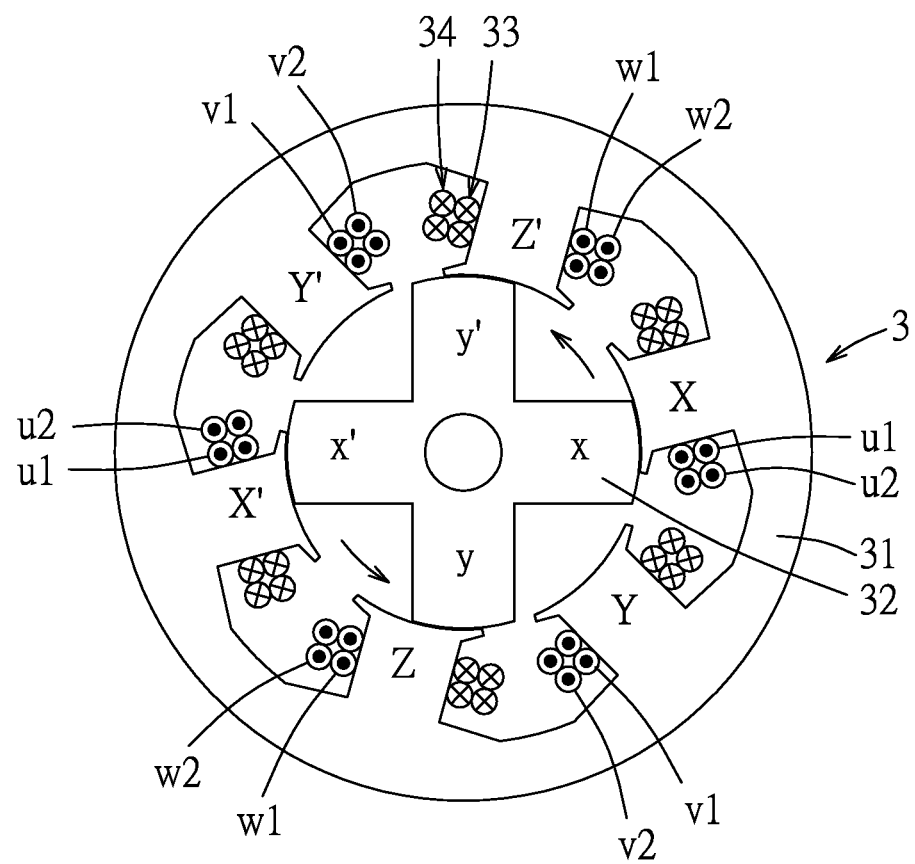
FIG. 5 is a partly-sectional schematic view illustrating an embodiment of a switched reluctance motor device according to the present invention.
Figure 6:
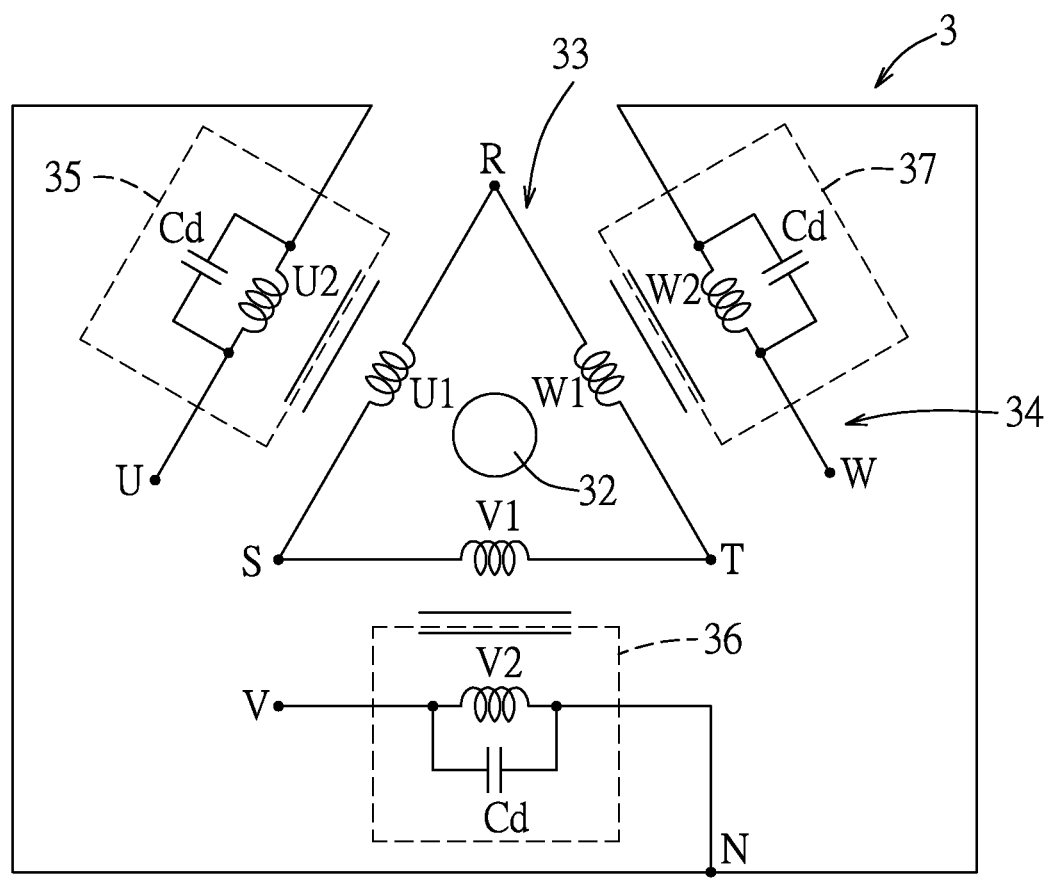
FIG. 6 is a schematic circuit diagram illustrating electrical connections between first and second winding components of the embodiment.
Figure 7:
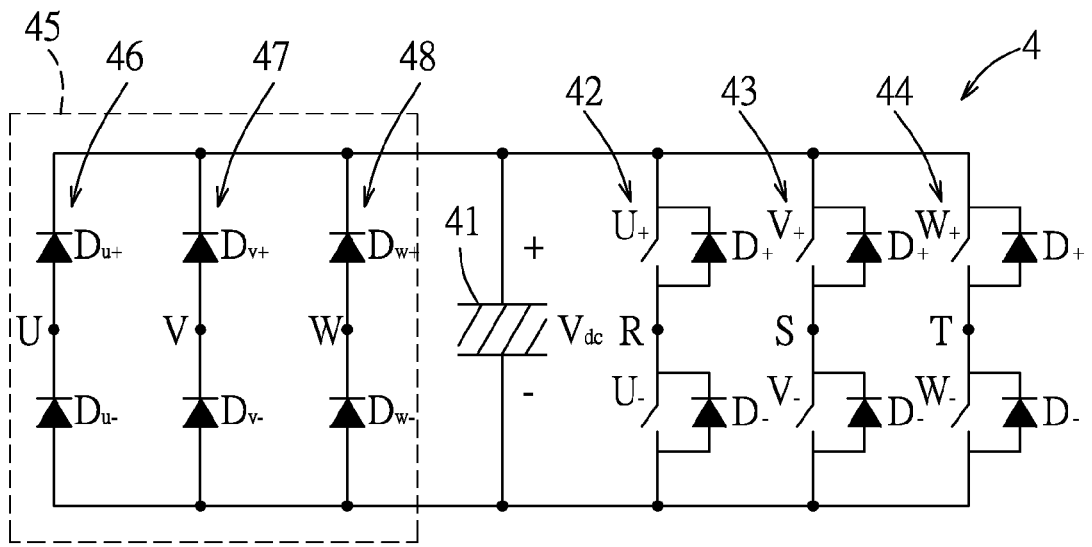
FIG. 7 is a schematic circuit diagram illustrating electrical connections among a driving circuit, the first winding component and the second winding component of the embodiment.

Referring to FIGS. 5 to 7, the embodiment of the switched reluctance motor device according to this invention is shown to include a reluctance motor 3 and a driving circuit 4.

The reluctance motor 3 includes a stator 31 and a rotor 32 disposed within the stator 31. In this embodiment, the switched reluctance motor device is a three-phase switched reluctance motor device, and the stator 31 has six projecting poles (X, X', Y, Y', Z, Z') that are evenly arranged. The reluctance motor 3 further includes a first winding component 33 and a second winding component 34 partially wound around the projecting poles (X, X', Y, Y', Z, Z'). In this embodiment, for each of the projecting poles (X, X', Y, Y', Z, Z'), the first winding component 33 is disposed at an inner side in contrast to the second winding component 34.

Referring to FIG. 6, the first winding component 33 has three first phase winding portions (U1, V1, W1) electrically coupled in series to form a Δ-configuration close loop with three first circuit nodes (R, S, T) among the first phase winding portions (U1, V1, W1), and the second winding component 34 has three second phase winding portions (U2, V2, W2) electrically coupled in a Y-configuration (i.e., a star-configuration) with a common node (N) thereamong and three second circuit nodes (U, V, W) respectively corresponding to the second phase winding portions (U2, V2, W2), and respectively corresponding to the first phase winding portions (U1, V1, W1).

Each of the first and second phase winding portions (U1, V1, W1, U2, V2, W2) has two windings (u1, v1, w1, u2, v2, w2), as shown in FIG. 5. The first phase winding portions (U1, V1, W1) respectively correspond to radially opposite pairs of the projecting poles (X-X', Y-Y', Z-Z') with the two windings (u1 or v1 or w1) of each first phase winding portion (U1 or V1 or W1) respectively wound around the projecting poles (X, X' or Y, Y' or Z, Z') of the corresponding radially opposite pair. Likewise, the second phase winding portions (U2, V2, W2) respectively correspond to the radially opposite pairs of the projecting poles (X-X', Y-Y', Z-Z') with the two windings (u2 or v2 or w2) of each second phase winding portion (U2 or V2 or W2) respectively wound around the projecting poles (X, X' or Y, Y' or Z, Z') of the corresponding radially opposite pair on top of the two windings (u1 or v1 or w1) of the respective first phase winding portion (U1 or V1 or W1). As such, the windings (ul, u2) of the phase winding portions (U1, U2) are coaxially wound around the radially opposite projecting poles (X, X'), the windings (v1, v2) of the phase winding portions (V1, V2) are coaxially wound around the radially opposite projecting poles (Y, Y'), and the windings (w1, w2) of the phase winding portions (W1, W2) are coaxially wound around the radially opposite projecting poles (Z, Z'). The rotor 32 of this embodiment has four evenly arranged salient poles (x, x', y, y'). In one embodiment, the first phase winding portions (U1, V1, W1) of the first winding component 33 and the second phase winding portions (U2, V2, W2) of the second winding component 34 have the same number of turns.

Referring to FIG. 7, the driving circuit 4 of this embodiment is electrically coupled to the reluctance motor 3 via the circuit nodes (R, S, T, U, V, W) for driving the reluctance motor 3, and includes a capacitor battery unit 41, a switching circuit that has three bridge arms 42, 43, 44 electrically coupled in parallel between positive and negative terminals of the capacitor battery unit 41, and a three-phase bridge rectifier circuit 45. The capacitor battery unit 41 is configured to provide a direct current (DC) voltage ($V_{dc}$) between the positive and negative terminals thereof to serve as a power source for driving the reluctance motor 3, is characterized in large current throughput, and may store 50 ampere-hour electric charges in this embodiment.

Each of the bridge arms 42, 43, 44 has a first switch ($U_+$, $V_+$, $W_+$) and a second switch ($U_-$, $V_-$, $W_-$) electrically coupled in series between the positive and negative terminals of the capacitor battery unit 41. A common node of each pair of the first switch ($U_+$, $V_+$, $W_+$) and the second switch ($U_-$, $V_-$, $W_-$) is electrically coupled to a respective one of the first circuit nodes (R, S, T). Each of the bridge arms 42, 43, 44 further has a first free-wheeling diode ($D_+$) electrically coupled to the first switch ($U_+$, $V_+$, $W_+$) in parallel and having an anode that is electrically coupled to the respective one of the first circuit nodes (R, S, T), and a second free-wheeling diode ($D_-$) electrically coupled to the second switch ($U_-$, $V_-$, $W_-$) in parallel and having a cathode that is electrically coupled to the respective one of the first circuit nodes (R, S, T). In this embodiment, each of the first and second switches ($U_+$, $V_+$, $W_+$, $U_-$, $V_-$, $W_-$) is a power transistor.

Referring to FIG. 6, the switched reluctance motor device of this embodiment further includes three damping capacitors (Cd) respectively and electrically coupled to the second phase winding portions (U2, V2, W2) in parallel, to thereby form three resonant circuits 35, 36, 37, respectively. In one embodiment, each of the damping capacitors (Cd) is a non-polar capacitor having an operating frequency that ranges between 300 Hz and 1000 Hz. In one embodiment, a switching frequency of the driving circuit 4 may be associated with a resonant frequency of the resonant circuits 35, 36, 37. That is, the switching frequency maybe determined according to the second phase winding portion (U2, V2, W2) and the damping capacitor (Cd) of the resonant circuit 35, 36, 37, and may be equal or close to the resonant frequency of the resonant circuit 35, 36, 37. In other words, the switching frequency of the driving circuit 4 maybe determined as being capable of inducing resonance of the resonant circuits 35, 36, 37. In one embodiment, the switching frequency is about 400 Hz. In application, the damping capacitors (Cd) may be incorporated into either the reluctance motor 3 or the driving circuit 4.

The three-phase bridge rectifier circuit 45 is electrically coupled to the resonant circuits 35, 36, 37, and includes three diode circuits (rectifier arms) 46, 47, 48 electrically coupled in parallel between the positive and negative terminals of the capacitor battery unit 41. Each of the diode circuits 46, 47, 48 includes a first diode ($D_{u+}$, $D_{v+}$, $D_{w+}$) and a second diode ($D_{u-}$, $D_{v-}$, $D_{w-}$) electrically coupled in series, and has a forward direction from the negative terminal of the capacitor battery unit 41 to the positive terminal of the capacitor battery unit 41. A common node of the first diode ($D_{u+}$, $D_{v+}$, $D_{w+}$) and the second diode ($D_{u-}$, $D_{v-}$, $D_{w-}$) of each of the diode circuits 46, 47, 48 is electrically coupled to a respective one of the second circuit nodes (U, V, W) of the second winding component 34.

In this embodiment, the driving circuit 4 is a switched controller that operates in a manner of phase-separated magnetization (magnetic shunt), and that sequentially switches the first phase winding portions (U1, V1, W1) of the first winding component 33 to a magnetizing state, in which the first phase winding portion (U1, V1 or W1) magnetizes the projecting poles (X, X' or Y, Y' or Z, Z') of the corresponding radially opposite pair due to a current flowing therethrough. That is, the driving circuit 4 is configured to make a conduction path between two bridge arms. As an example, the first switch ($U_+$) (first operating switch) of the bridge arm 42 and the second switch ($V_-$) (second operating switch) of the bridge arm 43 conduct, to thereby electrically couple the first phase winding portion (U1) (operating phase winding portion) to the capacitor battery unit 41, and switch the first phase winding portion (U1) to the magnetizing state using the DC voltage ($V_{dc}$) to convert the electric energy into magnetic energy. As a result, referring to FIG. 5, the projecting poles (X, X') of the stator 31 generate magnetic attractions that cause movements of the salient poles (x, x') of the rotor 32 toward the projecting poles (X, X'), respectively. Then, the switches ($U_+$, $V_-$) are switched to non-conducting (at this time, the first phase winding portion (U1) is switched to a demagnetizing state), and the first switch ($V_|$) of the bridge arm 43 and the second switch ($W_-$) of the bridge arm 44 are switched to conducting, to thereby electrically couple the first phase winding portion (V1) to the capacitor battery unit 41, and switch the first phase winding portion (V1) to the magnetizing state using the DC voltage ($V_{dc}$) to result in magnetic attractions that cause movements of the salient poles (y, y') of the rotor 32 toward the projecting poles (Y, Y'), respectively. Then, these two switches ($V_+$, $W_-$) are switched to non-conducting, and the first switch ($W_+$) of the bridge arm 44 and the second switch ($U_-$) of the bridge arm 42 are switched to conduct, to thereby switch the first phase winding portion (W1) to the magnetizing state. By repetition of the above-mentioned steps, the rotor 32 may be driven to rotate in the counterclockwise direction. In contrast, when the driving circuit 4 switches the first phase winding portions (U1, V1, W1) to the magnetizing state in a sequence of (W1), (V1) and (U1), the rotor 32 may be driven to rotate in the clockwise direction.

Figure 8:
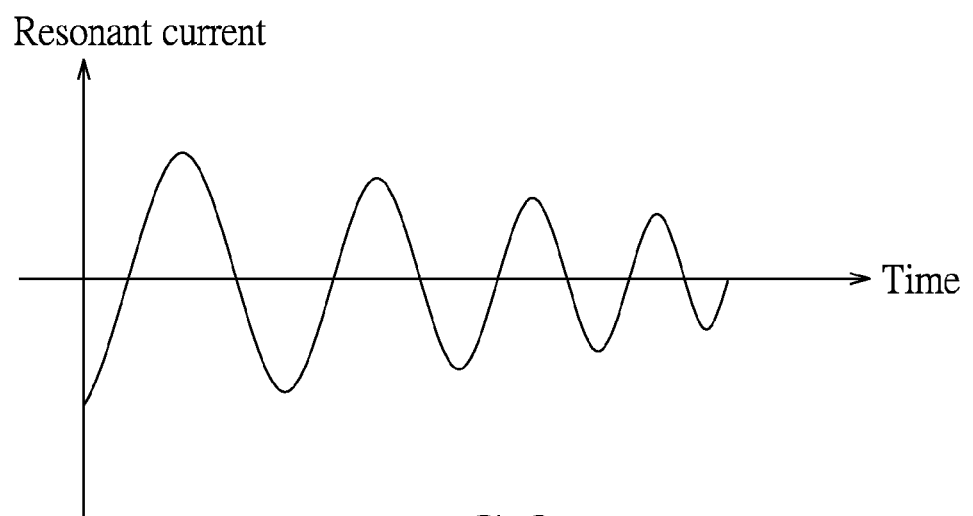
FIG. 8 is a waveform diagram illustrating a waveform of a resonant current when resonance occurs in resonant circuits of the embodiment.
Figure 9:
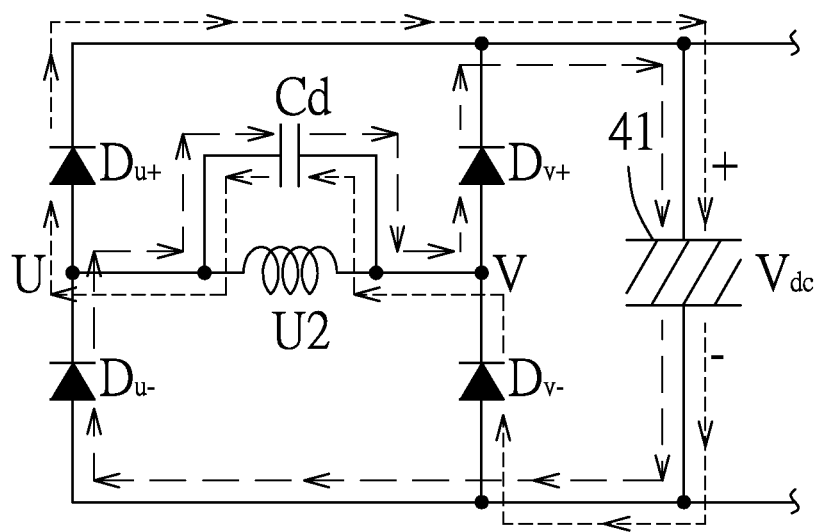
FIG. 9 is a schematic circuit diagram illustrating current flow of the resonant current that charges a capacitor battery unit.

Particularly, when the first phase winding portion that is in the magnetizing state, for example, the first phase winding portion (U1) that is coupled between the bridge arms 42, 43, is switched to the demagnetizing state from the magnetizing state by switching the switches ($U_+$, $V_-$) from conducting to non-conducting, the first phase winding portion (U1) may generate electric energy due to vanishing of the magnetic energy, i.e., generation of a counter-electromotive force may occur. At this time, since the switching frequency of the driving circuit 4 is equal or close to the resonant frequency of the resonant circuit 35 that corresponds in position to the first phase winding portion (U1), the resonant circuit 35 may sense energy provided by the counter-electromotive force to thereby induce resonance. Referring to FIGS. 8 and 9, a resonant current may be generated from the resonant circuit 35 to charge the capacitor battery unit 41 via the three-phase bridge rectifier circuit 45. Note that FIG. 9 shows an equivalent circuit of the three-phase bridge rectifier circuit 45, which operates as a full-wave rectifier circuit, to thereby illustrate current flow under this situation. When the resonant current is positive, and the damping capacitor (Cd) is charged by the resonant current to thereby have a voltage higher than that of the capacitor battery unit 41, a discharge current of the damping capacitor (Cd) may flow through a current loop formed by the damping capacitor (Cd), the first diode ($D_{v+}$), the capacitor battery unit 41, and the second diode ($D_{u-}$), to thereby charge the capacitor battery unit 41. When the resonant current is negative, and the damping capacitor (Cd) is charged by the resonant current to thereby have a voltage higher than that of the capacitor battery unit 41, a discharge current of the damping capacitor (Cd) may flow through a current loop formed by the damping capacitor (Cd), the first diode ($D_{u+}$), the capacitor battery unit 41, and the second diode ($D_{v-}$), to thereby charge the capacitor battery unit 41.

Similarly, when each of the first phase winding portions (V1, W1) is switched to the demagnetizing state from the magnetizing state, the corresponding resonant circuit 36, 37 may induce resonance to generate the resonant current and charge the capacitor battery unit 41 via the three-phase bridge rectifier circuit 45. Accordingly, the counter-electromotive force generated by the first phase winding portions (U1, V1, W1) maybe effectively reused to extend battery life of the capacitor battery unit 41.

It should be noted that the concept of this invention should not be limited in the three-phase reluctance motor device, and may be applied to other multiple-phase reluctance motor devices. In application to an N-phase reluctance motor device (N is an integer not smaller than 3), the stator 31 may have N pairs of opposite projecting poles; the first winding component 33 may include N first phase winding portions electrically coupled in series, forming a close loop that has N first circuit nodes among the first phase winding portions, and respectively wound around the N pairs of opposite projecting poles; the second winding component 34 may include N second phase winding portions respectively wound around the N pairs of opposite projecting poles, and electrically coupled in a star configuration; the driving circuit 4 may include N aforesaid bridge arms; and the rectifier circuit 45 may include N aforesaid diode circuits.

In summary, the embodiment of the switched reluctance motor device according to the present invention includes the first phase winding portions (U1, V1, W1) coupled in the Δ-configuration, and the resonant circuits 35, 36, 37 formed by the second phase winding portions (U2, V2, W2) that are coupled in the Y-configuration and corresponding damping capacitors (Cd) that are respectively coupled to the second phase winding portions (U2, V2, W2) in parallel, such that when one of the first phase winding portions (U1, V1, W1) is switched from the magnetizing state to the demagnetizing state, the counter-electromotive force thus generated may induce resonance in the corresponding resonant circuit 35, 36, 37, resulting in generation of the resonant current to charge the capacitor battery unit 41 via the three-phase bridge rectifier circuit 45. In such a manner, the counter-electromotive forces generated by the first phase winding portions (U1, V1, W1) may be effectively reused to extend the battery life of the capacitor battery unit 41.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A driving circuit for driving a reluctance motor, the reluctance motor including: a rotor; a stator; a first winding component having a number N of first phase winding portions that are wound around the stator, and that are electrically coupled in series to form a close loop having N first circuit nodes among the first phase winding portions, where N is an integer not smaller than 3 ; and a second winding component having N second phase winding portions that are wound around the stator, that respectively correspond to the first phase winding portions, and that are electrically coupled in a star configuration; for each corresponding pair of the first phase winding portions and the second phase winding portions, one of the first phase winding portion and the second phase winding portion being wound around the other of the first phase winding portion and the second phase winding portion, said driving circuit comprising:

a capacitor battery unit having a positive terminal and a negative terminal to provide a direct current (DC) voltage therebetween;

a switching circuit including:
N bridge arms electrically coupled in parallel between a positive terminal and a negative terminal of said capacitor battery unit, each of said bridge arms including a first switch and a second switch electrically coupled in series between said positive and negative terminals of said capacitor battery unit, a common node of said first and second switches electrically coupled to a respective one of the first circuit nodes; and N damping capacitors respectively and electrically coupled to said second phase winding portions in parallel, to thereby form N resonant circuits that respectively correspond to said N first phase winding portions and that are electrically coupled to said capacitor battery unit.

2. A reluctance motor comprising:
a rotor;
a stator;
a first winding component having a number N of first phase winding portions that are wound around said stator, and that are electrically coupled in series to form a close loop having N first circuit nodes among said first phase winding portions, where N is an integer not smaller than 3; and
a second winding component having N second phase winding portions that are wound around said stator, that respectively correspond to said first phase winding portions, and that are electrically coupled in a star configuration;

a switching circuit including:
N bridge arms electrically coupled in parallel between a positive terminal and a negative terminal of a capacitor battery unit, each of said bridge arms including a first switch and a second switch electrically coupled in series between said positive and negative terminals of said capacitor battery unit, a common node of said first and second switches electrically coupled to a respective one of the first circuit nodes; and
N damping capacitors respectively and electrically coupled to said second phase winding portions in parallel, to thereby form N resonant circuits that respectively correspond to said N first phase winding portions and that are electrically coupled to said capacitor battery unit;
wherein, for each corresponding pair of said first phase winding portions and said second phase winding portions, one of said first phase winding portion and said second phase winding portion is wound around the other of said first phase winding portion and said second phase winding portion.

3. The switched reluctance motor device according to claim 2, wherein each of said bridge arms of said switching circuit includes:
a first freewheeling diode electrically coupled to said first switch in parallel and having an anode that is electrically coupled to said common node of said first and second switches; and
a second freewheeling diode electrically coupled to said second switch in parallel and having a cathode that is electrically coupled to said common node of said first and second switches.

4. The switched reluctance motor device according to claim 1, further comprising a multi-phase rectifier circuit electrically coupled to said N resonant circuits and said capacitor battery unit, wherein, when said operating phase winding portion is in the demagnetizing state, the resonant current generated by said one of said resonant circuits charges said capacitor battery unit via said multi-phase rectifier circuit.

5. The switched reluctance motor device according to claim 4, wherein:
said capacitor battery unit has a positive terminal and a negative terminal to provide the DC voltage therebetween;
said N second phase winding portions have a common node thereamong and N second circuit nodes respectively corresponding thereto; and
said multi-phase rectifier circuit includes:
N rectifier arms electrically coupled to said capacitor battery unit in parallel between said positive terminal and said negative terminal of said capacitor battery unit, each of said rectifier arms including a first diode and a second diode that are electrically coupled in series between said positive and negative terminals of said capacitor battery unit, and having a forward direction from said negative terminal to said positive terminal of said capacitor battery unit, a common node of said first and second diodes being electrically coupled to a respective one of said second circuit nodes.

6. The switched reluctance motor device according to claim 1, wherein each of said damping capacitors is a non-polar capacitor having an operating frequency that ranges between 300 Hz and 1000 Hz.

7. A driving circuit for driving a reluctance motor, the reluctance motor including: a rotor; a stator; a first winding component having a number N of first phase winding portions that are wound around the stator, and that are electrically coupled in series to form a close loop having N first circuit nodes among the first phase winding portions, where N is an integer not smaller than 3; and a second winding component having N second phase winding portions that are wound around the stator, that respectively correspond to the first phase winding portions, and that are electrically coupled in a star configuration; for each corresponding pair of the first phase winding portions and the second phase winding portions, one of the first phase winding portion and the second phase winding portion being wound around the other of the first phase winding portion and the second phase winding portion, said driving circuit comprising:
a capacitor battery unit having a positive terminal and a negative terminal to provide a direct current (DC) voltage therebetween;
a switching circuit including:
N bridge arms electrically coupled in parallel between a positive terminal and a negative terminal of said capacitor battery unit, each of said bridge arms including a first switch and a second switch electrically coupled in series between said positive and negative terminals of said capacitor battery unit, a common node of said first and second switches being to be electrically coupled to a respective one of the first circuit nodes; and
N damping capacitors electrically coupled to said capacitor battery unit, and to be respectively and electrically coupled to the second phase winding portions in parallel.

8. The driving circuit according to claim 7, wherein each of said bridge arms of said switching circuit includes:
a first freewheeling diode electrically coupled to said first switch in parallel and having an anode that is electrically coupled to said common node of said first and second switches, and
a second freewheeling diode electrically coupled to said second switch in parallel and having a cathode that is electrically coupled to said common node of said first and second switches.

9. The driving circuit according to claim 7, the N second phase winding portions having a common node thereamong and N second circuit nodes respectively corresponding thereto, wherein said capacitor battery unit has a positive terminal and a negative terminal to provide the DC voltage therebetween;
said driving circuit further comprising a multi-phase rectifier circuit that includes:
N rectifier arms electrically coupled in parallel between said positive terminal and said negative terminal of said capacitor battery unit, each of said rectifier arms including a first diode and a second diode that are electrically coupled in series between said positive and negative terminals of said capacitor battery unit, and having a forward direction from said negative terminal to said positive terminal of said capacitor battery unit, a common node of said first and second diodes being to be electrically coupled to a respective one of the second circuit nodes.

10. The driving circuit according to claim 7, wherein each of said damping capacitors is a non-polar capacitor having an operating frequency that ranges between 300 Hz and 1000 Hz.

11. A reluctance motor comprising:

a rotor;

a stator;

a first winding component having a number N of first phase winding portions that are wound around said stator, and that are electrically coupled in series to form a close loop having N first circuit nodes among said first phase winding portions, where N is an integer not smaller than 3; and a second winding component having N second phase winding portions that are wound around said stator, that respectively correspond to said first phase winding portions, and that are electrically coupled in a star configuration;

wherein, for each corresponding pair of said first phase winding portions and said second phase winding portions, one of said first phase winding portion and said second phase winding portion is wound around the other of said first phase winding portion and said second phase winding portion.

12. The reluctance motor according to claim 11, wherein each of said damping capacitors is a non-polar capacitor having an operating frequency that ranges between 300Hz and 1000Hz.

* * * * *